(12) United States Patent
Grajewski et al.

(10) Patent No.: US 7,127,088 B1
(45) Date of Patent: Oct. 24, 2006

(54) METHOD OF AUTHENTICATING PROPER ACCESS TO SECURED SITE AND DEVICE FOR IMPLEMENTATION THEREOF

(75) Inventors: Joseph Grajewski, Oakton, VA (US); Douglas Jaeger, Fairfax, VA (US)

(73) Assignee: Mandylion Research Labs, LLC, Oakton, VA (US)

( * ) Notice: Subject to any disclaimer, the term of this patent is extended or adjusted under 35 U.S.C. 154(b) by 765 days.

(21) Appl. No.: 09/356,940

(22) Filed: Jul. 19, 1999

(51) Int. Cl.
*G06K 9/00* (2006.01)

(52) U.S. Cl. .................................... 382/124
(58) Field of Classification Search ......... 382/115–127
See application file for complete search history.

(56) References Cited

U.S. PATENT DOCUMENTS

| | | | |
|---|---|---|---|
| 4,532,508 A | 7/1985 | Ruell | 340/825.34 |
| 4,582,985 A | 4/1986 | Lofberg | 235/380 |
| 4,768,021 A * | 8/1988 | Ferraro | 340/568 |
| 4,993,068 A | 2/1991 | Piosenka | 380/23 |
| 4,998,279 A | 3/1991 | Weiss | 380/23 |
| 5,251,259 A | 10/1993 | Mosley | 380/23 |
| 5,367,572 A | 11/1994 | Weiss | 380/23 |
| 5,506,397 A | 4/1996 | Hoshino | 235/492 |
| 5,541,994 A | 7/1996 | Tomko et al. | 380/30 |
| 5,563,395 A | 10/1996 | Hoshino | 235/380 |
| 5,606,614 A | 2/1997 | Brady et al. | 380/23 |
| 5,627,355 A | 5/1997 | Rahman et al. | 235/380 |
| 5,648,648 A | 7/1997 | Chou et al. | 235/382 |
| 5,657,389 A | 8/1997 | Houvener | 380/23 |
| 5,680,460 A | 10/1997 | Tomko et al. | 380/23 |
| 5,712,912 A | 1/1998 | Tomko et al. | 380/23 |

(Continued)

FOREIGN PATENT DOCUMENTS

DE 29808147 U1 * 8/1998

(Continued)

OTHER PUBLICATIONS

PassManTM, archived website www.ijen.net/passman.htm, archived on Apr. 8, 1999 by the Wayback Machine at www.arcive.org, pp. 1-13.*

(Continued)

*Primary Examiner*—Brian Werner
(74) *Attorney, Agent, or Firm*—George R. McGuire; Bond, Schoeneck & King, PLLC

(57) ABSTRACT

Apparatus and method of verifying personal identity of an authorized user and providing information necessary to gain access to one or more secure sites in response to such verification. The apparatus is embodied in a hand-held device having an input pad for a biometric parameter such as a finger (thumb) print, an LCD and a small keypad. The device is initialized by placing the authorized user's thumb on the input pad and pressing an enter key to store a template commensurate with the thumb print. Thereafter, the device may be activated only by a match of a print presented to the input pad with the previously stored template. By operation of scroll keys on the device keypad, the user enters names of secure sites to which access is desired. A unique password is generated by a random number generator and assigned to each secure site named. The password is stored both in the device and in the computer of the secure site. After activation of the device, previously stored site names and passwords may be recalled and displayed on the device by operation of the keypad. The password is then communicated to the secure site computer via a separate PC. Biometric data is not transmitted or stored in a data file, but exists only in encypted form in the device.

2 Claims, 7 Drawing Sheets

U.S. PATENT DOCUMENTS

| | | | |
|---|---|---|---|
| 5,732,138 A * | 3/1998 | Noll et al. | 380/28 |
| 5,737,420 A | 4/1998 | Tomko et al. | 380/23 |
| 5,764,789 A | 6/1998 | Pare, Jr. et al. | 382/115 |
| 5,790,668 A | 8/1998 | Tomko | 380/25 |
| 5,869,822 A | 2/1999 | Meadows, II et al. | 235/380 |
| 5,878,137 A | 3/1999 | Ippolito et al. | 380/23 |
| 5,907,142 A | 5/1999 | Kelsey | 235/380 |
| 5,944,824 A * | 8/1999 | He | 713/201 |
| 6,088,143 A * | 7/2000 | Bang | 359/147 |
| 6,129,273 A * | 10/2000 | Shah | 235/380 |
| 6,161,185 A * | 12/2000 | Guthrie et al. | 713/201 |
| 6,315,195 B1 * | 11/2001 | Ramachandran | 235/380 |

FOREIGN PATENT DOCUMENTS

| | | | |
|---|---|---|---|
| DE | 199 38 001 A1 * | 9/2000 | |
| GB | 2 274 184 A * | 7/1994 | |

OTHER PUBLICATIONS

Notebooks.com, archive website www.notebooks.com, archived on Dec. 22, 1996 by the Wayback Machine at www.archive.org, pp. 1-34.*

PassGen, archived website http://www.world.std.com/~reinhold/passgen.html, archived on May 8, 1999 by the Wayback Machine at www.archive.org, pp. 1-8.*

WebConfidential, archived website http://web-confidential.com, Archived on Dec. 12, 1998 by the Wayback Machine at www.archive.org, pp. 1-51.*

* cited by examiner

US 7,127,088 B1

METHOD OF AUTHENTICATING PROPER ACCESS TO SECURED SITE AND DEVICE FOR IMPLEMENTATION THEREOF

BACKGROUND OF THE INVENTION

The present invention relates to apparatus for and methods of verifying both the physical identity of an individual and that individual's authority to gain access to a secured site. More particularly, the invention relates to methods of verifying user identity and authority to access an otherwise inaccessible physical space, body of data, etc., and to a hand-held device useful in the implementation of such methods. The methods and apparatus of the invention are of the type including input and recognition of a biometric parameter of the user.

For purposes of the present discussion and disclosure of the invention, the term "secure(d) site" is used to refer to both physical areas, spaces and devices, as well as electronic domains, databases, and the like, to which access is restricted to certain authorized users. Access to a secured site may be provided either entirely electronically, as to a data bank, or by a combination of electronic and mechanical means, as by releasing a lock in response to authenticated electrical signals. The term "biometric parameter/characteristic/feature" is used to denote one or more physical attributes uniquely associated with a particular individual, such as a finger, thumb or hand print, a retinal or facial scan, a DNA sample, and the like. The term "biometric template" refers to a body of stored or storable electronic signals which uniquely correspond to a biometric parameter. The acronym "PIN" (Personal Identification Number) is defined as a sequence of characters (numbers, letters, symbols, etc.) each of which is, or may be, represented by a corresponding electrical signal, electrically or magnetically recorded code, or the like, and is used synonymously with "password."

The art and science of authentication and identification of human individuals is embodied in the simple concept of uniqueness. Uniqueness is defined, within acceptable risk parameters, as one or a combination of only three possible things, namely, (in the order of their traditional ranking from weakest to strongest): 1. something known only (uniquely) by the individual and which is verifiable by the secure host (e.g., mother's maiden name, a PIN, etc.)

2. something physically possessed only (uniquely) by the individual and verifiable by the secure host (e.g., a token, smart card or synchronous algorithm result), and 3. some (unique) biometric parameter of the individual verifiable by the host. When one or more of these indicia of uniqueness is/are presented to and verified by the host, the individual is deemed to be authenticated as to identity and access to the secure site is permitted.

In order for an individual to present biometric and token based indicia of uniqueness to a host by conventional means, special provisions must be made at each host, often requiring apparatus at the user side interconnected to the host. For example, under traditional biometric and token based systems, a biometric template and/or token is passed to the host for authentication via a client-side reader compatible with the particular security/authentication hardware and software employed. The indicia of uniqueness must be received by the host and compared against a known and correlated collection of stored data. Accordingly, a privacy issue is raised as the individual user is required to relinquish otherwise private biometric data, in template form, to the host. Understandably, this results in a reluctance to accept and utilize such systems and is responsible, in large part, for the fact that such systems are not in widespread use today. Although a biometric scan is often used as the sole presentation of uniqueness to gain access to a secure workplace, and therefore "voluntary" only to the extent of accepting or declining the work, the combination of possessive (coded card) and cognitive (short PIN) indicia of uniqueness remains the ubiquitous form of authentication.

OBJECTS OF THE INVENTION

In general terms, the object of the present invention is to provide an authentication system based on indicia of uniqueness which includes biometric parameters without relinquishing personal possession and privacy of such parameters, i.e., a system wherein the host does not store or recognize biometric templates and plays no role in the authentication of the user.

More specifically, it is an object of the invention to provide an authentication system (apparatus and method) for gaining access to secure site(s) which requires no reader or other such input device at the user side interconnected to the host which protects access to the secured site.

Another object is to provide access authentication apparatus in the form of a hand-held device for storing a biometric parameter of an individual and operable to provide a PIN only in response to presentation of that parameter by the individual to input means on the device.

A further object is to provide novel and improved apparatus and methods of verifying the identity of an individual and authenticating that individual's authority to access a secure site utilizing biometric activation techniques and purely random PIN generation, timestamp management and encrypted storage, through a pocket-size device which never leaves the individual's possession.

Still another object is to provide a highly secure, totally private, commercially viable system of authenticating identity of an individual user and verifying that the individual is among those having authorized access to one or more secure sites.

A still further object is to provide apparatus for gaining access to a secured site wherein the apparatus is actuable only in response to confirmed biometric identification of the user without requiring storage of or otherwise permitting access to any biometric parameter or template other than by the user.

Other objects will in part be obvious and will in part appear hereinafter.

SUMMARY OF THE INVENTION

In accordance with and furtherance of the foregoing objects, the invention contemplates a form of security apparatus in the nature of a hand-held, pocket sized device comprising a unitary body portion having thereon a window for an LCD display, a small keypad and a biometric input pad. Within the body portion are a microprocessor with a plurality of on-chip peripheral devices including means for generating and storing a bionic template in response to biometric information presented to the input pad, a random number generator, ROM program storage, SRAM data storage and EEPROM memory. The device may optionally include a conventional output port. The keypad of the illustrated embodiment consists of four scroll keys (up, down, left, right) and an "enter" key. The device is initially set up, prior to the first use, by pressing the enter key, placing the ball of a selected finger (hereinafter assumed to be and denoted as a thumb print) on the biometric input pad until "Accepted" appears on the LCD display, indicating that the bionic template has been generated and stored within the device. The device may then be deactivated either by pressing the enter key or by non-use for a predetermined time period.

In order either to generate and store new PINs or to recall previously stored PINs for use with secure sites, the device must first be activated by the authorized user placing his/her thumb on the biometric input pad and pressing the enter key, whereupon the device will be activated if the presented thumb print template matches the previously stored template. To generate a new PIN, after activating the device the user presses the scroll-down key until "New Password" appears on the LCD display and then presses the enter key. The scroll keys are then used to compose an alphanumeric name, one character at a time, for the system to which the password is to apply. When the name assigned to the system appears in the LCD display, the enter key is again pressed. A template for the PIN (length, a/n positioning, security level) is displayed and the user enters the desired parameters and again presses the enter key, in response to which a random number is generated within the device and displayed in the LCD window. It is contemplated that the PIN will be relatively long, e.g., 20 characters, and is not intended to be memorized by the user. After going online to the logon screen of the system to be accessed via a PC in communications with the system, the user follows the system's instructions for initial PIN entry and enters the PIN shown in the LCD display via the PC keyboard. Alternatively, the PIN may be downloaded from memory within the device, through an output port on the device to PC memory or directly to the secure site via a PC in communication therewith. After entry of a PIN, the device is deactivated by pressing the enter key or by a period of non-use.

To access a system to which a name and PIN have been assigned, the user again activates the device by placing the thumb on the input pad and pressing the enter key. The scroll-down key is pressed until the name of the system to be accessed appears in the LCD display. The enter key is pressed, causing the previously assigned PIN to appear in the LCD display. The user enters the pin via the keyboard of the PC which is in communication with the system, whereupon the entered PIN is compared with the stored PIN and the user is granted access to the system. The device is capable of generating random PINs and storing them under a selected name for several (e.g., 20) systems to which the user is authorized to have access.

The PIN may be changed, i.e., a new PIN assigned to any system, whenever the user wishes by logging onto the system and going through the "Change Password" protocol. This procedure may also be followed for changing from a previously assigned PIN in a particular system to a PIN randomly generated by the device of the invention. In any case, before generating a new PIN or recalling a previously assigned PIN it is necessary to activate the device by means of the user's thumb print, thus preventing activation of the device to enter or recall PINs by anyone other than the user whose biometric template is stored in the device memory. Moreover, the user's biometric data does not leave his/her possession, the single biometric template being stored in the device only for purposes of comparison with thumb prints presented to the biometric input pad subsequent ot initialization. Accordingly, the device is useless to anyone other than the authorized user and no biometric information is even potentially accessible to others.

The foregoing and other features of construction and operation of the device, and the steps involved in practicing the method of the invention, will be more clearly understood and fully appreciated from the following detailed description, taken in conjunction with the accompanying drawings.

DETAILED DESCRIPTION

Figure 1:
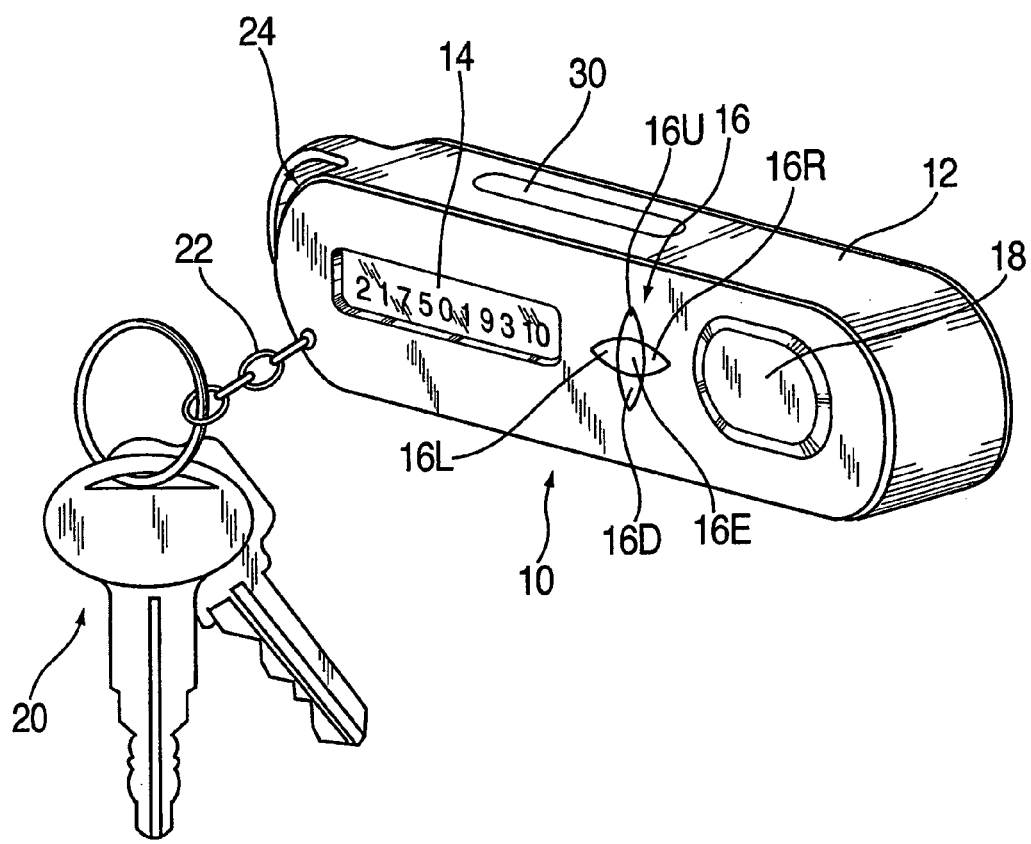
FIG. 1 is an illustration of a hand-held device representing an embodiment of the apparatus of the present invention.

The device of the invention, a physical example of which is shown in FIG. 1, is denoted generally by reference numeral 10. Device 10 includes body portion 12 which contains chips, microcircuits and other electronic modules for carrying out the various functions described later herein. Also on body 12 are window 14 through which an LCD display is visible, keypad 16 and biometric input pad 18. Ordinary keys 20 are shown, attached to body 12 by chain 22 passing through slot 24 at one end of the body; the keys have nothing to do with the present invention, but are shown to provide an indication of the intended scale of device 10, namely, that of a pocket-sized, hand-held item. In the illustrated embodiment keypad 16 includes a total of five keys, namely, up and down scroll keys 16U and 16D, respectively, left and right scroll keys 16L and 16R, respectively, and "enter" key 16E.

Figure 2:
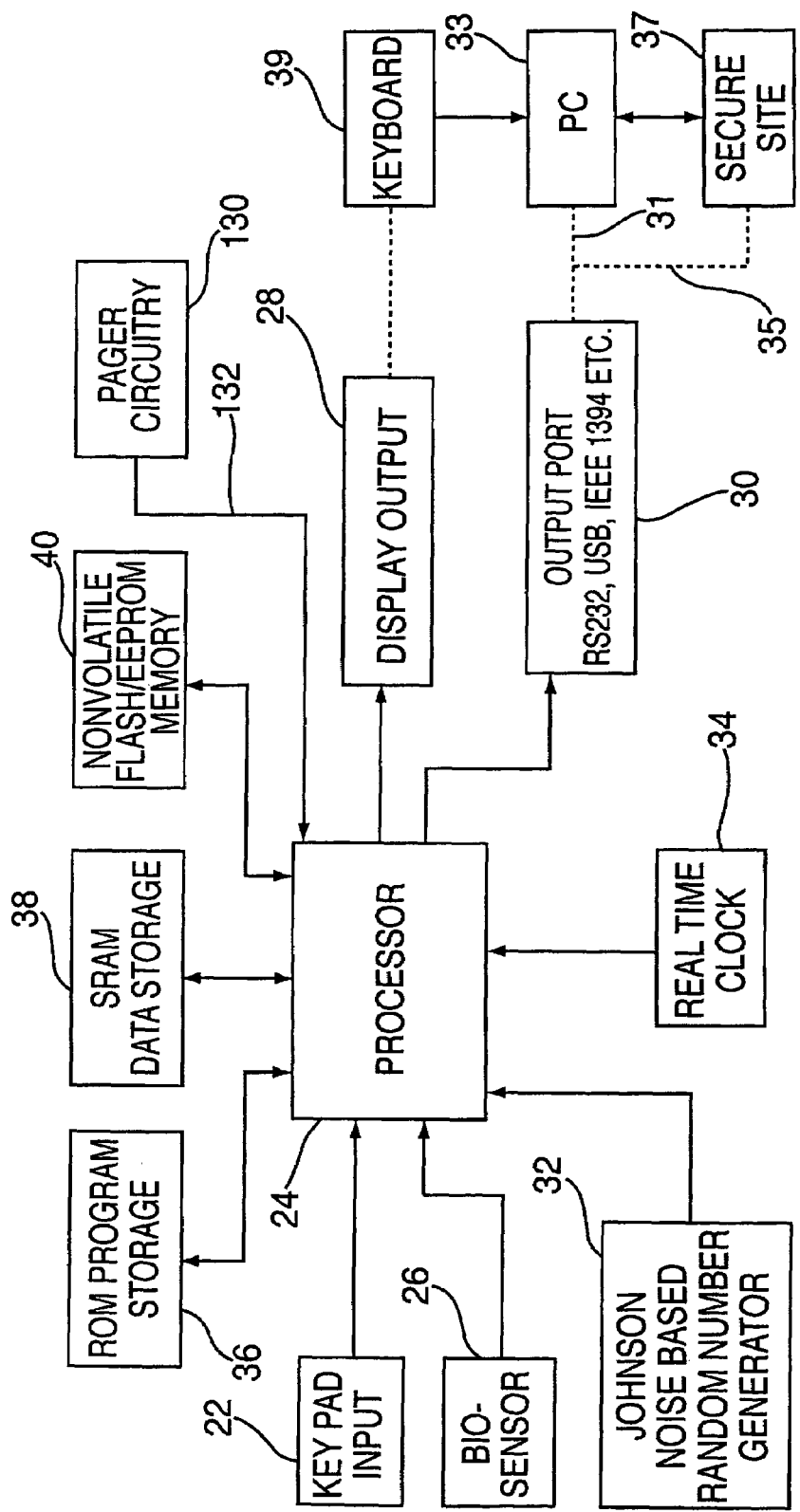
FIG. 2 is a block diagram illustrating the electronic components of the device of FIG. 1 and an independent PC.
Figure 3:
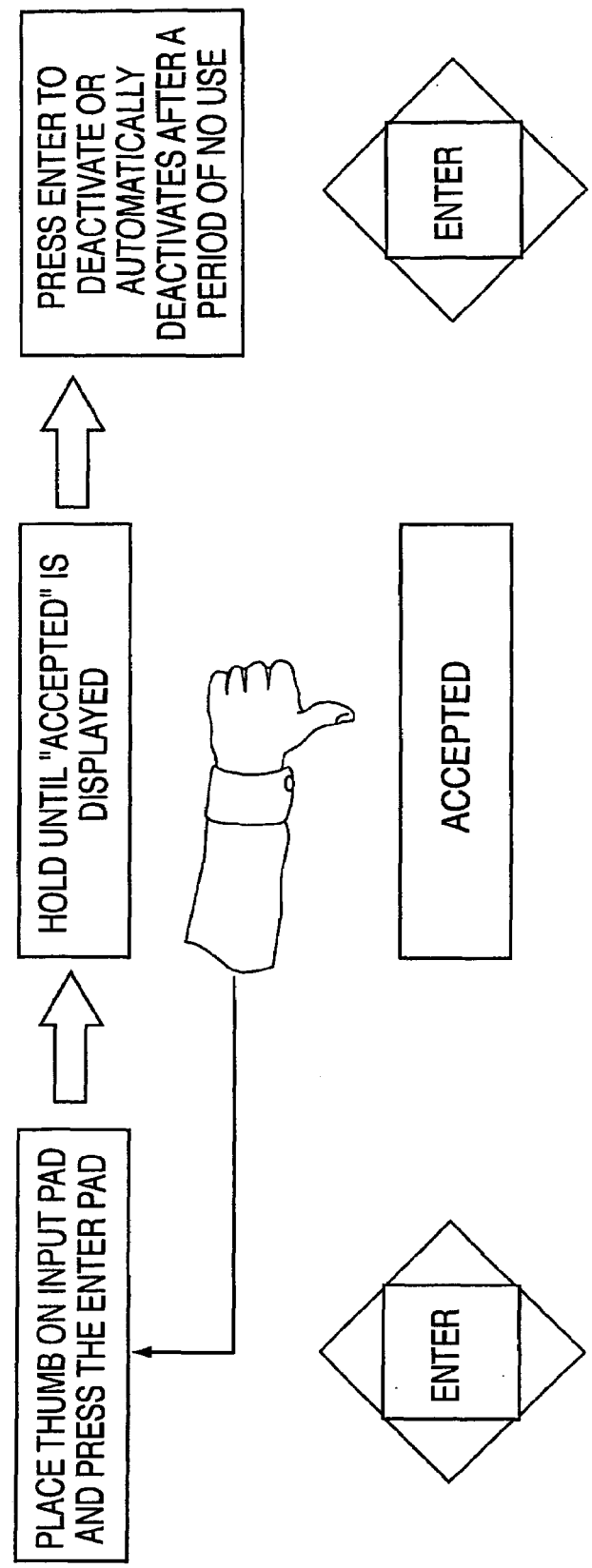
FIGS. 3 through 6 are partly pictorial flow charts illustrating the sequence of events in initializing, managing and utilizing the device of the invention in conjunction with a secure site.
Figure 4:
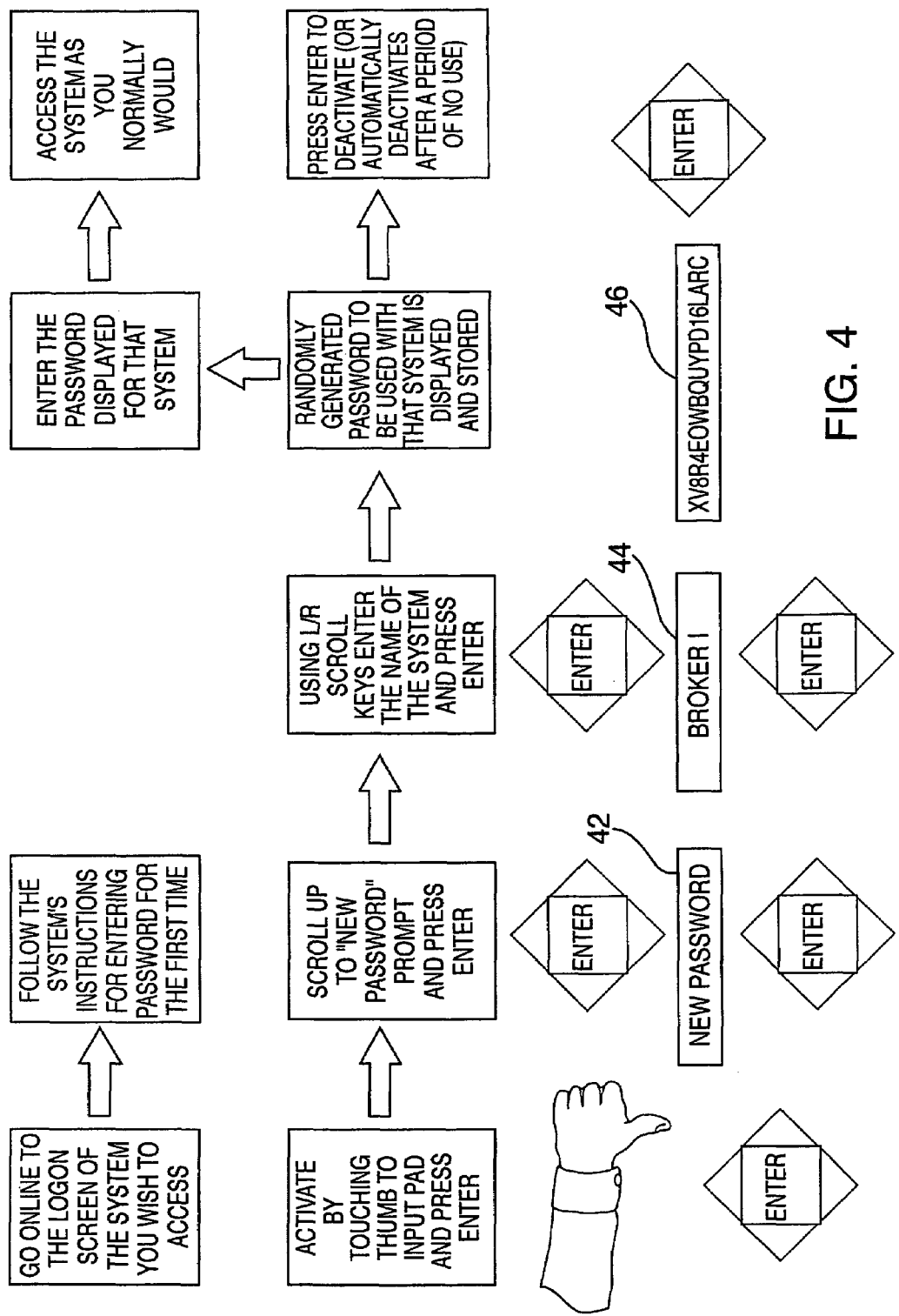

A block diagram of the electronic components of device 10 is seen in FIG. 2. Block 22 represents the conventional electronics which present signals generated by pressing the various keys of keypad 16 to microprocessor 24. Block 26 represents electronics, also of a commercially available type, which generate signals commensurate with a template of the bionic characteristic (thumb print) presented to input pad 18. The electronics which interface signals from processor 24 with the LCD display on device 10 are represented by block 28, and a conventional output port 30 may optionally be provided on body 12 for transmission of data through line 31 to separate computer (PC) 33 or through line 35 directly to secure site 37 in situations where the user is physically proximate to the secure site or to input means therefor having an input port compatible with output port 30. Rather than (or in addition to) providing an output port on device 10, the user may view the characters of display output 28 and manually enter them on keyboard 39 of PC 33 (or secure site 37. The remaining blocks in FIG. 2 represent other conventional components, any or all of which may be on-chip peripheral devices, including random number generator 32, real-time clock 34, ROM program storage 36; SRAM data storage 38 and nonvolatile flash/EEPROM memory 40, all of which interface with, or are a part of processor 24.

Turning now to FIGS. 3–7, the sequence of events in various stages of use of device 10 are illustrated. Preferably, device 10 is issued to a user by a manufacturer or other source with a unique code, tantamount to a serial number, as well as a number of "prompts" stored in selected memory locations. It is also preferred that the device be delivered to the user with a tamper proof seal in place over the biometric input pad and/or keypad. After removal of the seal, device 10 is initialized, i.e., set up prior to first use, by pressing enter key 16E and placing the user's thumb on input pad 18. Biosensor 26 generates a bionic template in the form of signals unique to the thumb print and transmits this template to processor 24 where it is stored in SRAM storage 38. Upon completion of this function, processor 24 connects a location in ROM storage 36 with LCD display output 28 causing the prestored prompt "Accepted" to appear in window 14. This indicates to the user that the biometric template commensurate with the user's thumb print has been generated and stored. Device 10 may then be deactivated by pressing enter key 16E or after passage of a predetermined period of non-use.

Device 10 may be used to generate and store one or (preferably) more (e.g., 20) PINs, each associated with a separate secure site (system) to which the user wishes to have selective, authorized access. The previously initialized device 10 is activated by placing the thumb on input pad 18 and simultaneously pressing enter key 16E. Scroll up key 16U is then pressed to bring up successive prompts on the LCD. For example, a single press of the scroll up key may cause the prompt "New Password?" to appear on the display, as indicated at 42, following which the user again presses enter key 16E. The right/left scroll keys may then be used to bring up the first character of the name given by the user to the system for which a PIN is to be generated. For example, if the PIN is to be used for gaining access to a brokerage account, the user may assign the name BROKER1 and proceed to bring up each character in succession, pressing the enter key after each character is brought into the display and double-clicking (pressing twice in rapid succession) the enter key upon appearance of the complete assigned name, indicated by block 44, in display 28. This signal, in addition to storing the assigned name in memory 40, causes random number generator 32 to generate a random PIN, preferably a relatively long (e.g., 20 character alphanumeric password) which replaces the system name in the display. The operator, before, during or after the foregoing PIN generation sequence, places PC 33 in communication with the host computer of secure site 37. That is, the user, via a PC wholly independent of device 10, goes online to the logon screen of the system to be accessed. Following the system's instructions for first-time entry of a PIN, the PIN appearing in the LCD display, indicated in FIG. 4 by reference numeral 46, is communicated to the host computer of secure site 37. The communication may be line 31 from output port 30 of device 10 to PC 33 and thence to the computer of secure site 37 or, when appropriate, directly via line 35 to the host computer. Alternatively, the user may manually enter via keyboard 39 the PIN displayed on the LCD and communicate the PIN from PC 33 to the computer of secure site 37. After communication and storage of the PIN in the host computer, device 10 may be deactivated by pressing enter key 16E or by expiration of a preset time period with the PIN stored both in device 10 and in the computer at the secure site.

Figure 5:
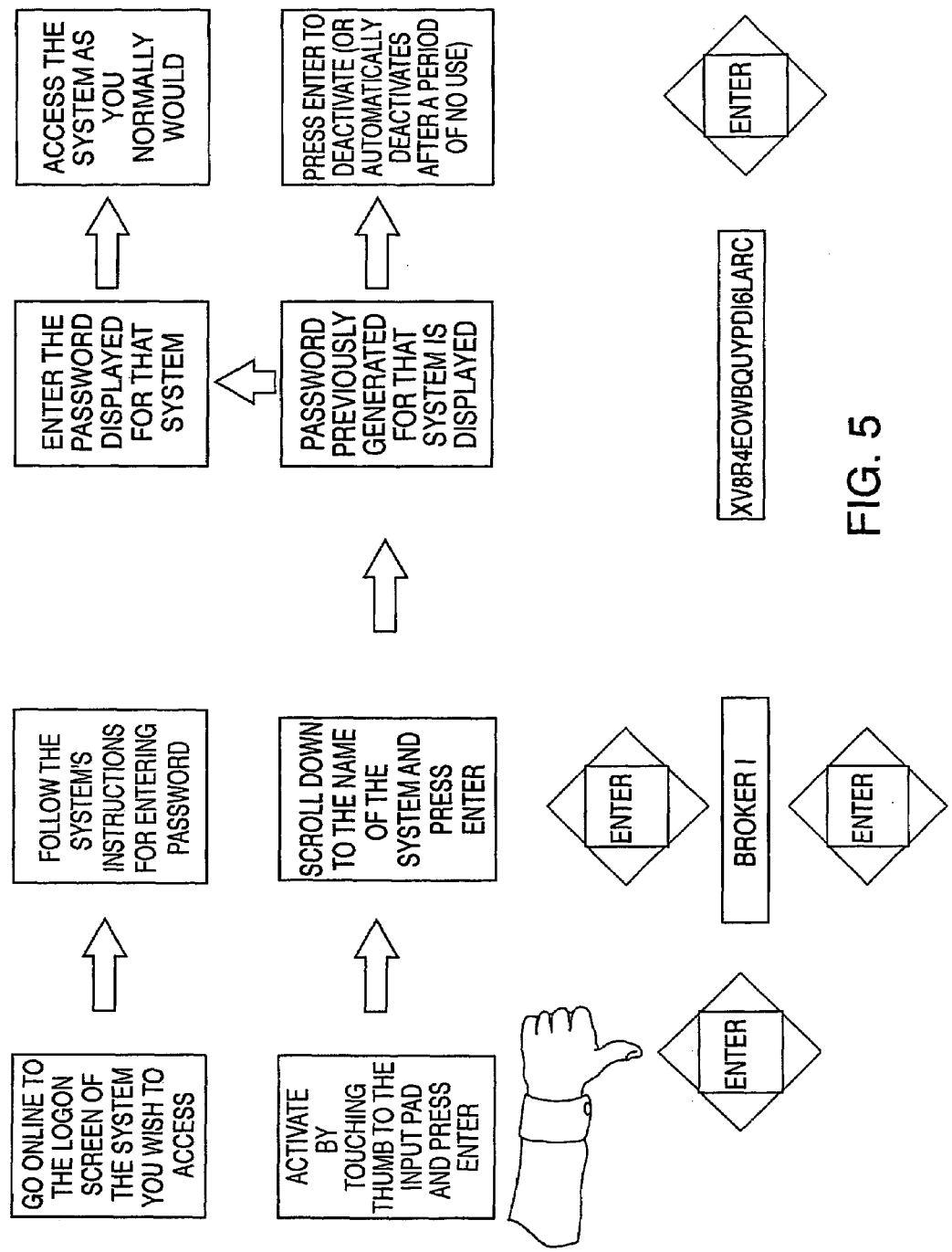

In order to access the secure site named BROKER1, the sequence of steps illustrated in FIG. 5 is followed. The user activates device 10 by placing the thumb on pad 18 and pressing enter key 16E. Scroll down key 16D is then pressed until the previously stored name BROKER1 appears in the LCD. Enter key 16E is again pressed and the PIN of display 46 replaces the system name of display 44. The user logs onto the secure site computer and enters PIN 46 via the PC keyboard 39 or through output port 30, as previously described. PIN 46 is compared with the user's previously stored PIN in the secure site computer and, upon confirming a match, access is granted. Device 10 is then deactivated as before.

Figure 6:
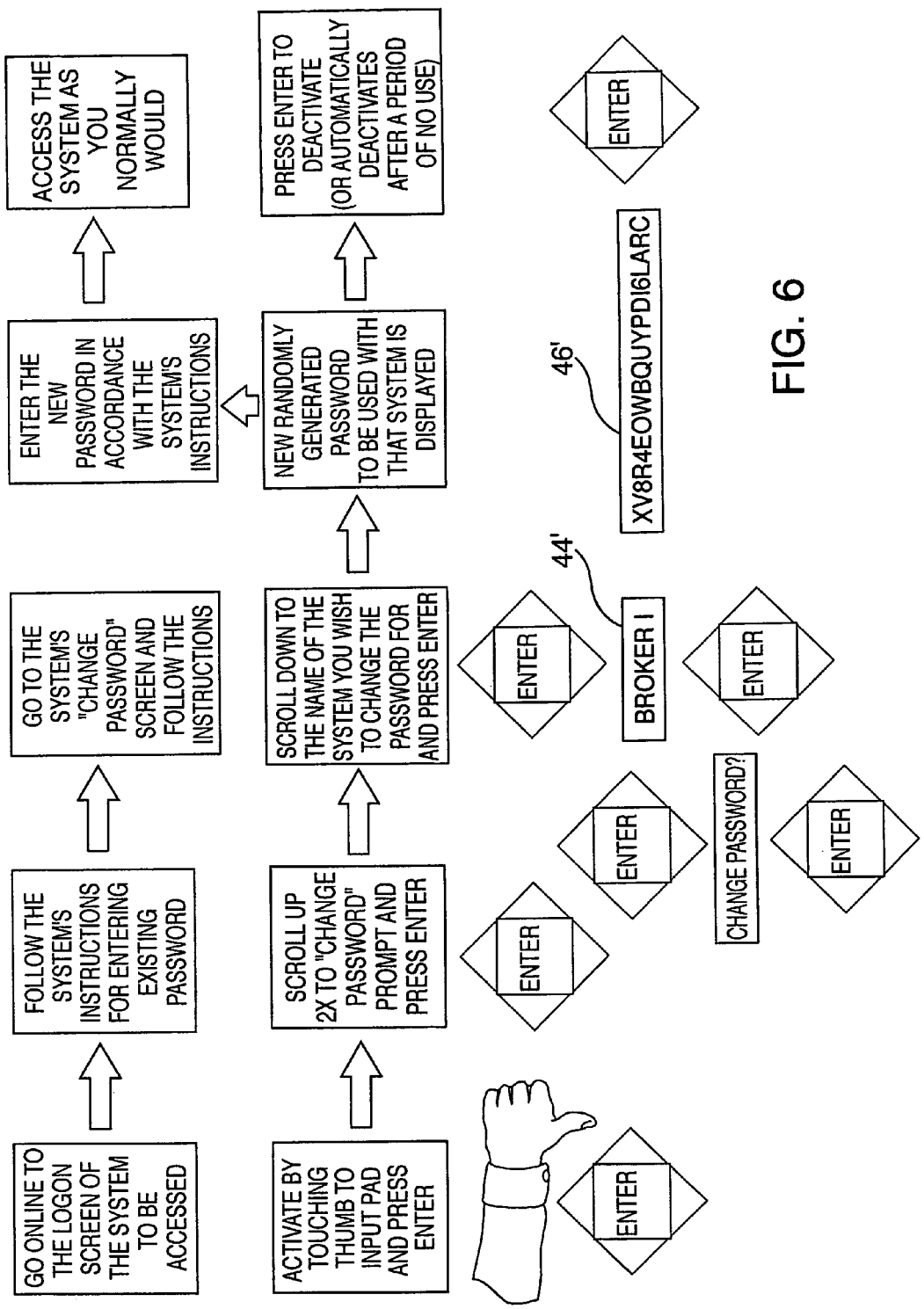

FIG. 6 illustrates the steps in managing or updating PINs, i.e., in changing a previously assigned PIN to a new PIN for use with device 10. Again, device 10 must be activated by placing the authorized user's thumb on pad 18 and pressing enter key 16E. The scroll up key is then pressed to bring up prompts on the display. If the prompt "New Password?" appears after the first press of key 16U, as previously described, the prompt "Change Password?" may be programmed to appear after the second press. With prompt 42' displayed, the user presses enter key 16E and then presses scroll down key 16D to bring up successive secure site (system) names in the display. When the name of the system for which the password is to be changed, e.g., BROKER1, appears as display 44' the user again presses enter key 16E. Random number generator 32 then creates a new PIN which will appear in display 46'. The user logs on, via PC 33 and its associated keyboard 39, to the system computer and follows its instructions for entering a changed password. The newly generated PIN (changed password) will then be stored in both device 10 and the system computer for future comparison and access authentication. Device 10 is deactivated as before.

Figure 7:
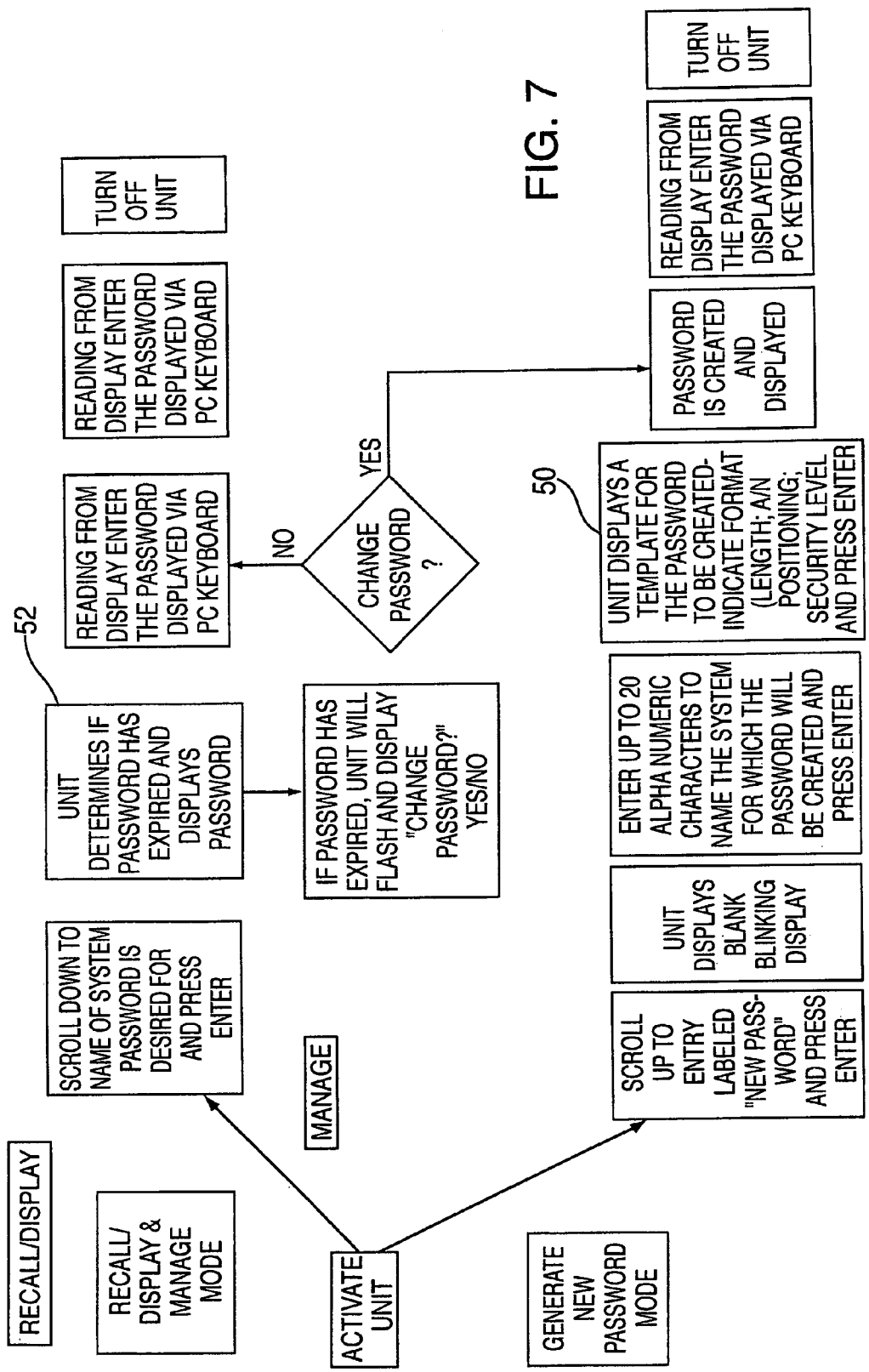
FIG. 7 is a flow chart illustrating two alternate modes of operation of the device.

FIG. 7, although somewhat repetitive, is useful in assimilating the manner of operation of device 10 in either generating new PINs or utilizing/changing previously generated and stored PINs. Some further, optional features of operation are also indicated in FIG. 7. The key, of course, is initializing the device by storing within its memory a template commensurate with the user's thumb print, and requiring the same thumb to be placed on biometric input pad 18 for matching with the stored template for any subsequent activation of the device. When device 10 is to be used to assign a PIN for the first time to a particular secure site, following the lower branch of FIG. 7, the operator presses scroll up key 16U once to bring up the prompt "New Password?" and presses enter key 16E, thereby bringing up a blank, blinking display in window 14. The scroll keys are then used to bring into the display successive characters in the name assigned to the system for which a PIN is to be generated, and the enter key is used to fix each selected character in the display. When the full name of the system has been entered, the enter key is double clicked. According to the preceding description, this directly resulted in generation of a random PIN which then appeared in the display. As indicated by block 50, the display may first contain a template for establishing parameters of the PIN prior to its actual generation and storage. For example, the user may make certain entries indicating the length, alphanumeric positioning, security level, and/or other such parameters which will be taken into account by random number generator 32. Use of a generator based on a Johnson Noise Amplifier is preferred in order to create truly random, rather than psuedo-random PINs. Also, each PIN may contain a so-called "watermark" linking it to the particular user, possibly with features of the stored biometric template included, although such techniques are conventional and not a part of the present invention.

The upper portion of FIG. 7 sets forth the steps involved in recalling, displaying and changing previously stored PINs. After activation, scroll down key 16D is pressed to display the names of systems to which PINs have been assigned. When the name of the desired system is displayed, the enter key is pressed. If desired, the electronics of device 10 may include automatic monitoring of one or more PINs. For example, as indicated by block 52, if the PIN previously assigned to the system whose name appears in the display has expired, e.g., by passage of a predetermined time period after initial generation or after having been recalled a predetermined number of times, the display may flash the "Change Password?" prompt, in response to which the user may press either key 16R for "yes" or 16L for "no." Even when the initially assigned PIN has not expired (or if there is no PIN expiration capability), the user may scroll up to the "Change Password?" prompt and press the enter key to generate a different PIN for the system named in the original display. Whether using the previously assigned or a newly generated (changed) PIN, the multi-character PIN will appear in the display and be manually entered by the user via keyboard 39, the keyboard/pad of the secure site, where such is available, or the line from output port 30.

From the foregoing it will be seen that the present invention provides a highly secure, authenticated environment in a device which is entirely within the possession and control of the user to which it is initially issued. The desirable feature of biometric authentication is provided without relinquishing personal control of any biometric information. That is, the invention does not require storage of biometric data anywhere other than in a small device intended to remain only in the possession of the original user, and essentially irretrievable and useless to anyone other than the user who may come into possession of the device. No biometric data, in template form or otherwise, is transmitted or compared to a file of such data at a host location. The device requires activation in response to biometric authentication, whereupon it will generate, store, display and manage large bit-size PINs for each of a plurality of systems to which the user requires authenticated access. There is no need for the user to memorize any password or to have any other unique knowledge. The generated PINs may contain a watermark or hash function extension which uniquely ensures that the PIN was created from an authenticated environment. While displayed on the device, the PIN is entered manually into a local system and transmitted to the secure site, which may be remote from the user. The computer at the secure site performs a look-up function, compares the entered PIN with that previously stored for the user and, upon validating a match, grants access.

Specific details of the electronic circuits and devices employed in the security device of the invention have not been provided as variety of commercially available devices may be employed, depending upon desired levels of operation and performance. Processor 24 is preferably a low-voltage device with built-in power management capabilities. Its particular size (e.g., 16, 32, 64-bit) and speed will depend upon the complexity of the algorithms used for encryption, PIN generation and bio-sensor analysis, as well as the desired response time vs. battery life. Generator 32 is preferably a Johnson Noise Based Random Number Generator, for reasons previously mentioned. Features such as the manner of encryption of the PIN database, mapping of the bio-data to an id-tag or template, etc. are matters of choice well within the present state of the art.

What is claimed is:

1. A method for creating, storing, and managing a password, comprising the steps of:
   a. providing a device comprising a portable body member, a data storage source contained in said body member, user interface and communication componentry for permitting said individual to store in said data storage source a plurality of indicia each one of which is representative of a secured site, and password circuitry comprising a random number enerator for randomly generating a plurality of passwords, wherein each of said plurality of passwords is uniquely associated with a respective one of said plurality of indicia;
   b. entering preselected indicia representative of a secured site into said device in response to a prompt generated by said device;
   c. instructing said device to randomly generate a string of characters of predetermined length that is representative of a password in response to a prompt generated by said device, wherein said password is uniquely associated with said indicia entered in step b; and
   d. repeating steps b and c in sequence for as many times as desired and permitted by said data storage source.

2. The method of claim 1, further comprising the step of instructing said device to generate a replacement password for said password created in step c in response to a prompt displayed on said portable body member after a predetermined period of time since said password was created in step c.

* * * * *